(12) United States Patent
Quan et al.

(10) Patent No.: US 10,264,608 B2
(45) Date of Patent: *Apr. 16, 2019

(54) DATA TRANSMISSION METHOD, BASE STATION, AND USER EQUIPMENT

(71) Applicant: HUAWEI TECHNOLOGIES CO., LTD., Shenzhen (CN)

(72) Inventors: Wei Quan, Beijing (CN); Xiaodong Yang, Beijing (CN); Zhenxing Hu, Beijing (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,471

(22) Filed: Nov. 3, 2017

(65) Prior Publication Data

US 2018/0063870 A1 Mar. 1, 2018

Related U.S. Application Data

(63) Continuation of application No. 15/010,336, filed on Jan. 29, 2016, now Pat. No. 9,820,307, which is a
(Continued)

(51) Int. Cl.
*H04W 40/00* (2009.01)
*H04W 72/04* (2009.01)
(Continued)

(52) U.S. Cl.
CPC ....... *H04W 74/0833* (2013.01); *H04L 1/1607* (2013.01); *H04L 1/189* (2013.01); *H04L 1/1896* (2013.01)

(58) Field of Classification Search
None
See application file for complete search history.

(56) References Cited

U.S. PATENT DOCUMENTS 8,982,755 B1 3/2015 Shah et al.
2010/0278064 A1 11/2010 Jeong
(Continued)

FOREIGN PATENT DOCUMENTS

CN 101646202 A 2/2010
CN 101651528 A 2/2010
(Continued)

OTHER PUBLICATIONS

U.S. Appl. No. 61/844,752, filed Jul. 10, 2013 (Year: 2013).*
(Continued)

*Primary Examiner* — Sithu Ko
(74) *Attorney, Agent, or Firm* — Kilpatrick Townsend & Stockton LLP

(57) ABSTRACT

Embodiments of the present invention provide a data transmission method, a base station, and user equipment, where the method includes: receiving bundling capability information sent by user equipment, where the Bundling capability information includes: information used to indicate that the user equipment has a capability of transmitting first data for M times, where M is a maximum quantity of transmission times that is supported by the user equipment for the first data, and M≥2; and performing transmission of the first data with the user equipment for N times according to the Bundling capability information, where N≤M.

20 Claims, 5 Drawing Sheets

Related U.S. Application Data continuation of application No. PCT/CN2013/080431, filed on Jul. 30, 2013.

(51) Int. Cl.
  *H04W 74/08* (2009.01)
  *H04L 1/16* (2006.01)
  *H04L 1/18* (2006.01)

(56) References Cited

U.S. PATENT DOCUMENTS

| | | |
|---|---|---|
| 2011/0002262 A1 | 1/2011 | Wang et al. |
| 2011/0141991 A1 | 6/2011 | Gao |
| 2014/0140318 A1 | 5/2014 | Uemura et al. |
| 2015/0016312 A1* | 1/2015 | Li ................ H04W 74/0833 370/280 |
| 2015/0173105 A1* | 6/2015 | Bergstrom .......... H04W 74/006 370/329 |

FOREIGN PATENT DOCUMENTS

| | | |
|---|---|---|
| CN | 102142941 A | 8/2011 |
| EP | 2725861 A1 | 4/2014 |
| JP | 2013005366 A | 1/2013 |
| WO | 2013055034 A1 | 4/2013 |

OTHER PUBLICATIONS

3GPP TS 36.331 V11.4.0 3rd Generation Partnership Project;Technical Specification Group Radio Access Network; Evolved Universal Terrestrial Radio Access (E-UTRA);Radio Resource Control (RRC);Protocol specification(Release 11), Technical Specification, Jun. 2013, 346 pages.

3GPP TS 36.306 V11.3.0 3rd Generation Partnership Project;Technical Specification Group Radio Access Network; Evolved Universal Terrestrial Radio Access (E-UTRA);User Equipment (UE) radio access capabilities(Release 11), Technical Specification, Mar. 2013, 27 pages.

* cited by examiner

DATA TRANSMISSION METHOD, BASE STATION, AND USER EQUIPMENT

CROSS-REFERENCE TO RELATED APPLICATIONS

This application is a continuation of U.S. patent application Ser. No. 15/010,336, filed on Jan. 29, 2016 which is a continuation of International Application No. PCT/CN2013/080431, filed on Jul. 30, 2013, All of the afore-mentioned patent applications are hereby incorporated by reference in their entireties.

TECHNICAL FIELD

Embodiments of the present invention relate to communications technologies, and in particular, to a data transmission method, a base station, and user equipment.

BACKGROUND

In a long term evolution (LTE) system, when data sent by user equipment (UE) cannot be properly received by a serving base station, the UE performs uplink retransmission, where each retransmission time is about 8 ms. When the UE is on an edge of a cell, because of limited transmit power of the UE, the UE may need to perform uplink retransmission for multiple times to ensure that the serving base station can properly receive the data. Therefore, the data may undergo a quite long delay, which greatly affects user experience.

To resolve the foregoing problem, in uplink data transmission, transmission time interval bundling (TTI Bundling) is introduced, that is, a base station configures an uplink TTI Bundling function for UE. Therefore, each time the UE uses a physical uplink shared channel (Physical Uplink Shared Channel, PUSCH) to transmit uplink data, the UE transmits the uplink data for four times in four consecutive transmission time intervals (transmission time interval, TTI). The base station feeds back an acknowledgement (ACK) or a negative acknowledgement (NACK) only at a moment corresponding to the last TTI of the four TTIs in the bundling transmission. If a NACK is fed back, the UE is triggered to continue to retransmit the uplink data, so as to ensure quality of the uplink data transmission and reduce a delay, thereby improving user experience.

In the foregoing data transmission mode of TTI Bundling, only a transmission process of PUSCH uplink data is considered. However, in transmission processes of various types of other uplink and downlink data, a problem of a delay and unreliable transmission also exists. For example, when there is important data to be transmitted in downlink, for example, when a handover of the UE occurs, the base station sends a handover command to the UE. If the UE cannot properly receive the handover command because signal quality is relatively poor, the base station needs to retransmit the handover command. In this case, because the base station cannot learn whether the UE has a Bundling capability in downlink, if the handover command is retransmitted according to a conventional technology, for example, according to a hybrid automatic repeat request (Hybrid Automatic Repeat Request, HARQ), the UE may be unable to properly receive the handover command due to the delay and the like, which causes a final handover failure of the UE.

SUMMARY

Embodiments of the present invention provide a data transmission method, a base station, and user equipment, which are used to implement highly reliable data transmission between the base station and the user equipment.

According to a first aspect, an embodiment of the present invention provides a data transmission method, including:

receiving bundling capability information sent by user equipment, where the Bundling capability information includes: information used to indicate that the user equipment has a capability of transmitting first data for M times, where M is a maximum quantity of transmission times that is supported by the user equipment for the first data, and $M \geq 2$; and performing transmission of the first data with the user equipment for N times according to the Bundling capability information, where $N \leq M$.

In a first possible implementation manner of the first aspect, the Bundling capability information includes physical downlink shared channel PDSCH Bundling capability information;

the first data includes first PDSCH data; and the performing transmission of the first data with the user equipment for N times includes:

sending the first PDSCH data to the user equipment for N times.

In a second possible implementation manner of the first aspect, the Bundling capability information includes physical downlink control channel PDCCH Bundling capability information and physical downlink shared channel PDSCH Bundling capability information;

the first data includes second PDCCH data and second PDSCH data; and the performing transmission of the first data with the user equipment for N times includes:

sending the second PDCCH data and the second PDSCH data to the user equipment for N times.

In a third possible implementation manner of the first aspect, the bundling capability information includes frequency domain Bundling capability information;

N is specifically a quantity of transmission times, in a first frequency domain, of the first data; and the performing transmission of the first data with the user equipment for N times includes:

performing transmission of the first data with the user equipment in the first frequency domain for N times.

In a fourth possible implementation manner of the first aspect, the Bundling capability information includes physical random access channel PRACH Bundling capability information;

the first data includes a preamble; and the performing transmission of the first data with the user equipment for N times includes:

receiving, for N times, the preamble sent by the user equipment.

With reference to the fourth possible implementation manner of the first aspect, in a fifth possible implementation manner of the first aspect, before the receiving, for N times, the preamble sent by the user equipment, the method includes:

configuring a PRACH resource Bundling parameter for the user equipment, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M; and sending the PRACH resource Bundling parameter to the user equipment, where:

the at least one quantity of transmission times is used by the user equipment to select one from the at least one quantity of transmission times as N.

With reference to the fifth possible implementation manner of the first aspect, in a sixth possible implementation manner of the first aspect, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured; and each quantity of transmission times is corresponding to at least one preamble.

With reference to the fifth or the sixth possible implementation manner of the first aspect, in a seventh possible implementation manner of the first aspect, the PRACH resource Bundling parameter further includes a transmission mode of the preamble corresponding to the quantity of transmission times, where the transmission mode includes:

transmitting the preamble on the PRACH resource corresponding to the quantity of transmission times; or transmitting the preamble on a PRACH resource except the PRACH resource corresponding to the quantity of transmission times.

With reference to any one of the fourth to the seventh possible implementation manners of the first aspect, in an eighth possible implementation manner of the first aspect, after the receiving, for N times, the preamble sent by the user equipment, the method further includes:

performing joint processing on the N received preambles, where the joint processing is processing the N preambles as an entirety; and sending a random access response to the user equipment.

With reference to the first aspect or any one of the first to the eighth possible implementation manners of the first aspect, in a ninth possible implementation manner of the first aspect, the receiving bundling capability information sent by user equipment includes:

receiving Bundling capability information that is carried in a feature group indicator and sent by the user equipment; or receiving Bundling capability information that is carried in capability information and sent by the user equipment.

With reference to the first aspect or any one of the first to the ninth possible implementation manners of the first aspect, in a tenth possible implementation manner of the first aspect, the performing transmission of the first data with the user equipment for N times according to the Bundling capability information includes: determining N according to the Bundling capability information and a preset policy, and performing transmission of the first data with the user equipment for N times; or the Bundling capability information further includes information about at least one corresponding quantity of transmission times that is less than M, and the performing transmission of the first data with the user equipment for N times according to the Bundling capability information includes: determining one quantity of transmission times from the at least one corresponding quantity of transmission time as N according to M and the at least one corresponding quantity of transmission times that is less than M, and performing transmission of the first data with the user equipment for N times.

According to a second aspect, an embodiment of the present invention provides a data transmission method, including:

sending bundling capability information to a base station, where the Bundling capability information includes: information used to indicate that user equipment has a capability of transmitting first data for M times, where M is a maximum quantity of transmission times that is supported by the user equipment for the first data, and M≥2; and performing transmission of the first data with the base station for N times according to the Bundling capability information, where N≤M.

In a first possible implementation manner of the second aspect, the Bundling capability information includes physical downlink shared channel PDSCH Bundling capability information;

the first data includes first PDSCH data; and the performing transmission of the first data with the base station for N times includes:

receiving, for N times, the first PDSCH data sent by the base station.

In a second possible implementation manner of the second aspect, the Bundling capability information includes physical downlink control channel PDCCH Bundling capability information and physical downlink shared channel PDSCH Bundling capability information;

the first data includes second PDCCH data and second PDSCH data; and the performing transmission of the first data with the base station for N times includes:

receiving, for N times, the second PDCCH data and the second PDSCH data that are sent by the base station.

In a third possible implementation manner of the second aspect, the bundling capability information includes frequency domain Bundling capability information;

N is specifically a quantity of transmission times, in a first frequency domain, of the first data; and the performing transmission of the first data with the base station for N times includes:

performing transmission of the first data with the base station in the first frequency domain for N times.

In a fourth possible implementation manner of the second aspect, the Bundling capability information includes physical random access channel PRACH Bundling capability information;

the first data includes a preamble; and the performing transmission of the first data with the base station for N times includes:

sending the preamble to the base station for N times.

With reference to the fourth possible implementation manner of the second aspect, in a fifth possible implementation manner of the second aspect, before the sending the preamble to the base station for N times, the method includes:

receiving a PRACH resource Bundling parameter sent by the base station, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M; and selecting N from the at least one quantity of transmission times according to the PRACH resource Bundling parameter; and the sending the preamble to the base station for N times includes:

sending, to the base station for N times according to N, a preamble corresponding to N.

With reference to the fifth possible implementation manner of the second aspect, in a sixth possible implementation manner of the second aspect, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured by the base station; and each quantity of transmission times is corresponding to at least one preamble.

With reference to the fifth or the sixth possible implementation manner of the second aspect, in a seventh possible implementation manner of the second aspect, the selecting N from the at least one quantity of transmission times includes:

selecting N from the at least one quantity of transmission times according to a path loss threshold.

With reference to any one of the fifth to the seventh possible implementation manners of the second aspect, in an eighth possible implementation manner of the second aspect, the sending, to the base station for N times according to N, a preamble corresponding to N includes:

sending, for N times according to N, the preamble on a PRACH resource corresponding to N; or sending, for N times according to N, the preamble on a PRACH resource except a PRACH resource corresponding to N.

With reference to any one of the fifth to the eighth possible implementation manners of the second aspect, in the eighth possible implementation manner of the second aspect, after the sending, to the base station according to N, a preamble corresponding to N, the method further includes:

receiving a random access response sent by the base station.

With reference to the second aspect or any one of the first to the ninth possible implementation manners of the second aspect, in a tenth possible implementation manner of the second aspect, the sending Bundling capability information to a base station includes:

sending, to the base station, Bundling capability information carried in a feature group indicator; or sending, to the base station, Bundling capability information carried in capability information.

According to a third aspect, an embodiment of the present invention provides a base station, including:

a receiving module, configured to receive bundling capability information sent by user equipment, where the Bundling capability information includes: information used to indicate that the user equipment has a capability of transmitting first data for M times, where M is a maximum quantity of transmission times that is supported by the user equipment for the first data, and M≥2; and a transmitting module, configured to perform transmission of the first data with the user equipment for N times according to the Bundling capability information received by the receiving module, where N≤M.

In a first possible implementation manner of the third aspect, the Bundling capability information received by the receiving module includes physical downlink shared channel PDSCH Bundling capability information;

the first data includes first PDSCH data; and the transmitting module is configured to send the first PDSCH data to the user equipment for N times.

In a second possible implementation manner of the third aspect, the Bundling capability information received by the receiving module includes physical downlink control channel PDCCH Bundling capability information and physical downlink shared channel PDSCH Bundling capability information;

the first data includes second PDCCH data and second PDSCH data; and the transmitting module is configured to send the second PDCCH data and the second PDSCH data to the user equipment for N times.

In a third possible implementation manner of the third aspect, the Bundling capability information received by the receiving module includes frequency domain Bundling capability information;

N is specifically a quantity of transmission times, in a first frequency domain, of the first data; and the transmitting module is configured to perform transmission of the first data with the user equipment in the first frequency domain for N times.

In a fourth possible implementation manner of the third aspect, the Bundling capability information received by the receiving module includes physical random access channel PRACH Bundling capability information;

the first data includes a preamble; and the transmitting module is configured to receive, for N times, the preamble sent by the user equipment.

With reference to the fourth possible implementation manner of the third aspect, in a fifth possible implementation manner of the third aspect, the base station further includes:

a configuring module, configured to configure a PRACH resource Bundling parameter for the user equipment, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M, where the transmitting module is configured to send the PRACH resource Bundling parameter to the user equipment, where:

the at least one quantity of transmission times is used by the user equipment to select one from the at least one quantity of transmission times as N.

With reference to the fifth possible implementation manner of the third aspect, in a sixth possible implementation manner of the third aspect, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured; and each quantity of transmission times is corresponding to at least one preamble.

With reference to the fifth or the sixth possible implementation manner of the third aspect, in a seventh possible implementation manner of the third aspect, the PRACH resource Bundling parameter further includes a transmission mode of the preamble corresponding to the quantity of transmission times, where the transmission mode includes:

transmitting the preamble on the PRACH resource corresponding to the quantity of transmission times; or transmitting the preamble on a PRACH resource except the PRACH resource corresponding to the quantity of transmission times.

With reference to any one of the fourth to the seventh possible implementation manners of the third aspect, in an eighth possible implementation manner of the third aspect, the base station further includes: a processing module, configured to perform joint processing on the N received preambles, where the joint processing is processing the N preambles as an entirety; and the transmitting module is further configured to send a random access response to the user equipment.

With reference to the third aspect or any one of the first to the eighth possible implementation manners of the third aspect, in a ninth possible implementation manner of the third aspect, the receiving module is configured to: receive Bundling capability information that is carried in a feature group indicator and sent by the user equipment; or receive Bundling capability information that is carried in capability information and sent by the user equipment.

With reference to the third aspect or any one of the first to the ninth possible implementation manners of the third aspect, in a tenth possible implementation manner of the third aspect, the base station further includes a determining module, where:

the determining module is configured to determine N according to the Bundling capability information and a preset policy; or configured to determine one quantity of transmission times as N according to M and at least one corresponding quantity of transmission times that is less than M, where M and the at least one corresponding quantity of transmission times that is less than M are included in the Bundling capability information; and the transmitting module is configured to perform transmission of the first data with the user equipment for N times according to N determined by the determining module.

According to a fourth aspect, an embodiment of the present invention provides a user equipment, including:

a sending module, configured to send bundling capability information to a base station, where the Bundling capability information includes: information used to indicate that the user equipment has a capability of transmitting first data for M times, where M is a maximum quantity of transmission times that is supported by the user equipment for the first data, and M≥2; and a transmitting module, configured to perform transmission of the first data with the base station for N times according to the Bundling capability information sent by the sending module, where N≤M.

In a first possible implementation manner of the fourth aspect, the Bundling capability information sent by the sending module includes physical downlink shared channel PDSCH Bundling capability information;

the first data includes first PDSCH data; and the transmitting module is configured to receive, for N times, the first PDSCH data sent by the base station.

In a second possible implementation manner of the fourth aspect, the Bundling capability information sent by the sending module includes physical downlink control channel PDCCH Bundling capability information and physical downlink shared channel PDSCH Bundling capability information;

the first data includes second PDCCH data and second PDSCH data; and the transmitting module is configured to receive, for N times, the second PDCCH data and the second PDSCH data that are sent by the base station.

In a third possible implementation manner of the fourth aspect, the Bundling capability information sent by the sending module includes frequency domain Bundling capability information;

N is specifically a quantity of transmission times, in a first frequency domain, of the first data; and the transmitting module is configured to perform transmission of the first data with the base station in the first frequency domain for N times.

In a fourth possible implementation manner of the fourth aspect, the Bundling capability information sent by the sending module includes physical random access channel PRACH Bundling capability information;

the first data includes a preamble; and the transmitting module is configured to send the preamble to the base station for N times.

With reference to the fourth possible implementation manner of the fourth aspect, in a fifth possible implementation manner of the fourth aspect, the user equipment further includes:

a receiving module, configured to receive a PRACH resource Bundling parameter sent by the base station, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M; and a processing module, configured to select N from the at least one quantity of transmission times according to the PRACH resource Bundling parameter; and the transmitting module is configured to send, to the base station for N times according to N, a preamble corresponding to N.

With reference to the fifth possible implementation manner of the fourth aspect, in a sixth possible implementation manner of the fourth aspect, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured by the base station; and each quantity of transmission times is corresponding to at least one preamble.

With reference to the fifth or the sixth possible implementation manner of the fourth aspect, in a seventh possible implementation manner of the fourth aspect, the processing module is configured to select N from the at least one quantity of transmission times according to a path loss threshold.

With reference to any one of the fifth to the seventh possible implementation manners of the fourth aspect, in an eighth possible implementation manner of the fourth aspect, the transmitting module is configured to: send, for N times according to N, the preamble on a PRACH resource corresponding to N; or send, for N times according to N, the preamble on a PRACH resource except a PRACH resource corresponding to N.

With reference to any one of the fifth to the eighth possible implementation manners of the fourth aspect, in the ninth possible implementation manner of the fourth aspect, the receiving module is further configured to receive a random access response sent by the base station.

With reference to the fourth aspect or any one of the first to the ninth possible implementation manners of the fourth aspect, in a tenth possible implementation manner of the fourth aspect, the sending module is configured to: send, to the base station, Bundling capability information carried in a feature group indicator; or send, to the base station, Bundling capability information carried in capability information.

According to a fifth aspect, an embodiment of the present invention provides a base station, including: a memory, a processor, a receiver, and a transmitter, where:

the memory is configured to store code of a data transmission method;

the processor is configured to execute the code stored in the memory and control the receiver to receive bundling capability information sent by user equipment, where the Bundling capability information indicates a Bundling capability supported by the user equipment; and the processor is further configured to control, according to the Bundling capability information received by the receiver, the receiver or the transmitter to perform data transmission with the user equipment.

In a first possible implementation manner of the fifth aspect, the Bundling capability information received by the receiver includes physical downlink shared channel PDSCH Bundling capability information;

the first data includes first PDSCH data; and the transmitter is configured to send the first PDSCH data to the user equipment for N times.

In a second possible implementation manner of the fifth aspect, the Bundling capability information received by the receiver includes physical downlink control channel PDCCH Bundling capability information and physical downlink shared channel PDSCH Bundling capability information;

the first data includes second PDCCH data and second PDSCH data; and the transmitter is configured to send the second PDCCH data and the second PDSCH data to the user equipment for N times.

In a third possible implementation manner of the fifth aspect, the Bundling capability information received by the receiver includes frequency domain Bundling capability information;

N is specifically a quantity of transmission times, in a first frequency domain, of the first data; and the receiver or the transmitter is configured to perform transmission of the first data with the user equipment in the first frequency domain for N times.

In a fourth possible implementation manner of the fifth aspect, the Bundling capability information received by the receiver includes physical random access channel PRACH Bundling capability information;

the first data includes a preamble; and the receiver is configured to receive, for N times, the preamble sent by the user equipment.

With reference to the fourth possible implementation manner of the fifth aspect, in a fifth possible implementation manner of the fifth aspect, the processor is further configured to execute the code stored in the memory and configure a PRACH resource Bundling parameter for the user equipment, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M; and the transmitter is configured to send the PRACH resource Bundling parameter to the user equipment, where:

the at least one quantity of transmission times is used by the user equipment to select one from the at least one quantity of transmission times as N.

With reference to the fifth possible implementation manner of the fifth aspect, in a sixth possible implementation manner of the fifth aspect, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured; and each quantity of transmission times is corresponding to at least one preamble.

With reference to the fifth or the sixth possible implementation manner of the fifth aspect, in a seventh possible implementation manner of the fifth aspect, the PRACH resource Bundling parameter further includes a transmission mode of the preamble corresponding to the quantity of transmission times, where the transmission mode includes:

transmitting the preamble on the PRACH resource corresponding to the quantity of transmission times; or transmitting the preamble on a PRACH resource except the PRACH resource corresponding to the quantity of transmission times.

With reference to any one of the fourth to the seventh possible implementation manners of the fifth aspect, in an eighth possible implementation manner of the fifth aspect, the processor is further configured to execute the code stored in the memory and perform joint processing on the N received preambles, where the joint processing is processing the N preambles as an entirety; and the transmitter is further configured to send a random access response to the user equipment.

With reference to the fifth aspect or any one of the first to the eighth possible implementation manners of the fifth aspect, in a ninth possible implementation manner of the fifth aspect, the receiver is configured to: receive Bundling capability information that is carried in a feature group indicator and sent by the user equipment; or receive Bundling capability information that is carried in capability information and sent by the user equipment.

With reference to the fifth aspect or any one of the first to the ninth possible implementation manners of the fifth aspect, in a tenth possible implementation manner of the fifth aspect, the processor is further configured to execute the code stored in the memory, and determine N according to the Bundling capability information and a preset policy; or determine one quantity of transmission times from the at least one corresponding quantity of transmission time as N according to M and at least one corresponding quantity of transmission times that is less than M, where M and the at least one corresponding quantity of transmission times that is less than M are included in the Bundling capability information; and the receiver or the transmitter is configured to perform transmission of the first data with the user equipment for N times according to N determined by the processor.

According to a sixth aspect, an embodiment of the present invention provides user equipment, including: a memory, a processor, a transmitter, and a receiver, where:

the memory is configured to store code of a data transmission method;

the processor is configured to execute the code stored in the memory and control the sender transmitter to send bundling capability information to a base station; and the processor is further configured to control, according to the Bundling capability information sent by the sender transmitter, the receiver or the transmitter to perform data transmission with the base station.

In a first possible implementation manner of the sixth aspect, the Bundling capability information sent by the transmitter includes physical downlink shared channel PDSCH Bundling capability information;

the first data includes first PDSCH data; and the transmission receiver is configured to receive, for N times, the first PDSCH data sent by the base station.

In a second possible implementation manner of the sixth aspect, the Bundling capability information sent by the transmitter includes physical downlink control channel PDCCH Bundling capability information and physical downlink shared channel PDSCH Bundling capability information;

the first data includes second PDCCH data and second PDSCH data; and the receiver is configured to receive, for N times, the second PDCCH data and the second PDSCH data that are sent by the base station.

In a third possible implementation manner of the sixth aspect, the Bundling capability information sent by the transmitter includes frequency domain Bundling capability information;

N is specifically a quantity of transmission times, in a first frequency domain, of the first data; and the receiver or the transmitter is configured to perform transmission of the first data with the base station in the first frequency domain for N times.

In a fourth possible implementation manner of the sixth aspect, the Bundling capability information sent by the transmitter includes physical random access channel PRACH Bundling capability information;

the first data includes a preamble; and the transmitter is configured to send the preamble to the base station for N times.

With reference to the fourth possible implementation manner of the sixth aspect, in a fifth possible implementation manner of the sixth aspect, before the preamble is sent to the base station for N times:

the receiver is configured to receive a PRACH resource Bundling parameter sent by the base station, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M;

N is selected from the at least one quantity of transmission times according to the PRACH resource Bundling parameter; and the transmitter is configured to send, to the base station for N times according to N, a preamble corresponding to N.

With reference to the fifth possible implementation manner of the sixth aspect, in a sixth possible implementation manner of the sixth aspect, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured by the base station; and each quantity of transmission times is corresponding to at least one preamble.

With reference to the fifth or the sixth possible implementation manner of the sixth aspect, in a seventh possible implementation manner of the sixth aspect, the processor is further configured to execute the code stored in the memory, and select N from the at least one quantity of transmission times according to a path loss threshold.

With reference to any one of the fifth to the seventh possible implementation manners of the sixth aspect, in an eighth possible implementation manner of the sixth aspect, the transmitter is configured to: send, for N times according to N, the preamble on a PRACH resource corresponding to N; or send, for N times according to N, the preamble on a PRACH resource except a PRACH resource corresponding to N.

With reference to any one of the fifth to the eighth possible implementation manners of the sixth aspect, in the ninth possible implementation manner of the sixth aspect, the receiver is further configured to receive a random access response sent by the base station.

With reference to the sixth aspect or any one of the first to the ninth possible implementation manners of the sixth aspect, in a tenth possible implementation manner of the sixth aspect, the transmitter is configured to: send, to the base station, Bundling capability information carried in a feature group indicator; or send, to the base station, Bundling capability information carried in capability information.

According to the data transmission method, the base station, and the user equipment that are provided in the embodiments of the present invention, in a process of transmitting a specific piece of first data, the base station performs transmission of the first data with the user equipment for N times according to received Bundling capability information sent by the user equipment, that is, receives a same piece of data for N times or sends a same piece of data for N times, thereby implementing highly reliable data transmission between the base station and the user equipment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
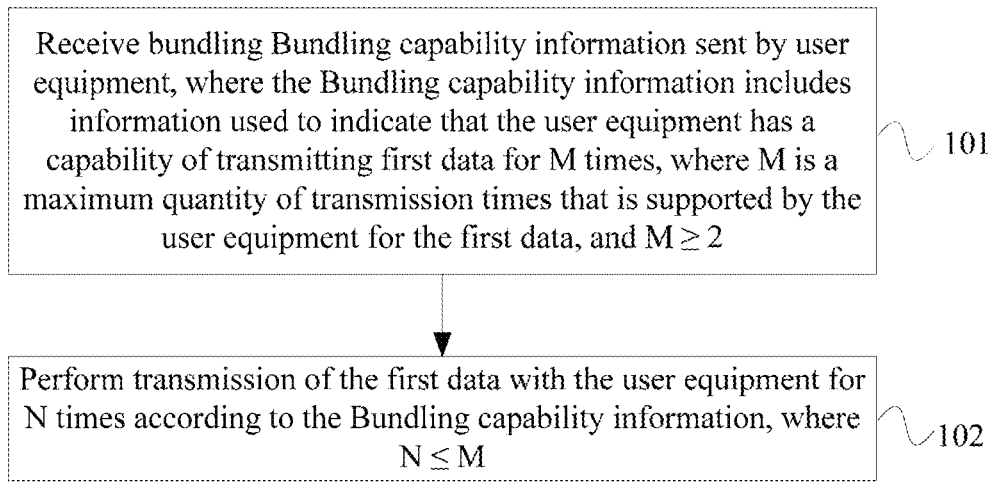
FIG. 1 is a flowchart of a first embodiment of a data transmission method according to the present invention.

FIG. 1 is a flowchart of a first embodiment of a data transmission method according to the present invention. An execution body in this embodiment is a base station. Specifically, this embodiment includes the following steps:

101. Receive bundling capability information sent by user equipment, where the Bundling capability information includes: information used to indicate that the user equipment has a capability of transmitting first data for M times, where M is a maximum quantity of transmission times that is supported by the user equipment for the first data, and $M \geq 2$.

The base station receives the Bundling capability information sent by the user equipment. A Bundling capability indicates that the user equipment has a capability of transmitting the first data for M times, where M is the maximum quantity of transmission times, and $M \geq 2$. For example, in a process of transmitting a specific piece of first data, if the first data is uplink data, the user equipment can at most send the first data for M times; and if the first data is downlink data, the user equipment can at most receive the first data for M times. For clarity of description, a data transmission mode described in the present invention is referred to as a Bundling transmission mode, and an existing transmission mode is referred to as a non-Bundling transmission mode.

In this step, the user equipment reports the Bundling capability information to the base station, and indicates to the base station that the user equipment has a capability of receiving or sending the first data for multiple times, where the Bundling capability information may directly carry the maximum quantity of transmission times M, or may not carry the maximum quantity of transmission times M. If the bundling capability information carries the maximum quantity of transmission times, M, for example, the Bundling capability information includes multiple quantities of transmission times, a maximum quantity of transmission times in the multiple quantities of transmission times is M. Otherwise, if the bundling capability information does not carry the maximum quantity of transmission times, M, an agreed symbol may be used to indicate the information that the foregoing user equipment has a capability of transmitting the first data for M times, so that the base station can further determine the foregoing maximum quantity of transmission times, M, according to a pre-agreement and the symbol. In addition, it may also be directly agreed that the maximum quantity of transmission times is M, without a need to carry the maximum quantity of transmission times, M, or the agreed symbol.

Optionally, in this step, an actual quantity of transmission times, N ($N \leq M$), may be set in a protocol according to a preset policy, so that in a process of transmitting the first data, the fixed quantity of transmission times, N, is used; or the user equipment may also add, to the Bundling capability information, at least one corresponding quantity of transmission times that is less than M and supported by the user equipment and send the bundling capability information to the base station, and the base station determines one quantity of transmission times from the at least one corresponding quantity of transmission times as N; or the base station may configure some quantities of transmission times for the user equipment, and the user equipment selects a specific value of N.

Optionally, in this embodiment, the Bundling capability information includes at least one of the following information:

downlink Bundling capability information, which indicates that the user equipment supports downlink Bundling (DL Bundling), that is, the user equipment has a capability of receiving the first data for M times;

uplink and downlink Bundling capability information, which indicates that the user equipment supports downlink and uplink Bundling (DL and UL Bundling), that is, if the first data is uplink data, the user equipment has a capability of sending the first data for M times, and if the first data is downlink data, the user equipment has a capability of receiving the first data for M times;

physical downlink shared channel PDSCH Bundling capability information, which indicates that the user equipment supports PDSCH Bundling, that is, if the first data is PDSCH data, the user equipment has a capability of receiving the PDSCH data for M times;

physical downlink control channel PDCCH Bundling capability information and physical downlink shared channel PDSCH Bundling capability information, which indicate that the user equipment supports PDCCH Bundling and PDSCH Bundling, that is, if the first data includes PDCCH data and PDSCH data, the user equipment has a capability of receiving the PDCCH data for M times and receiving the PDSCH data for M times;

physical random access channel PRACH Bundling capability information, which indicates that the user equipment supports PRACH Bundling, that is, if the first data is a preamble, the user equipment has a capability of sending the preamble for M times;

time domain Bundling capability information, which indicates that the user equipment supports time domain Bundling, that is, in a frequency domain, the user equipment has a capability of sending the first data for M times or receiving the first data for M times;

frequency domain Bundling capability information, which indicates that the user equipment supports frequency domain Bundling, that is, in a time domain, the user equipment has a capability of sending the first data for M times or receiving the first data for M times;

information about a Bundling capability of receiving new data, which indicates that the user equipment supports a Bundling capability of receiving new data by using a same process within a specific time, where in this case, the first data is the new data, that is, data that is received by the user equipment for the first time; for example, the information indicates that the user equipment supports a capability of receiving new data for M times by using a same process within a specific time when a timer is HARQ_RTT_Time; or the information indicates that the user equipment supports a capability of receiving new data for M times by using a same process after a specific time, for example, the information indicates that the user equipment supports a capability of receiving new data for M times by using a same process after several consecutive TTIs (for example, four TTIs);

information about a Bundling capability of receiving retransmitted data, which indicates that the user equipment supports a Bundling capability of receiving retransmitted data by using a same process within a specific time, where in this case, the first data is the retransmitted data; for example, the information indicates that the user equipment supports a capability of receiving retransmitted data for M times by using a same process within a specific time when a timer is HARQ_RTT_Time; or the information indicates that the user equipment supports a capability of receiving retransmitted data for M times by using a same process after a specific time, for example, the information indicates that the user equipment supports a Bundling capability of receiving retransmitted data by using a same process after several consecutive TTIs (for example, four TTIs);

information about a Bundling capability of receiving retransmitted data and performing combination and decoding on the retransmitted data and previously newly transmitted or retransmitted data, which indicates that the user equipment supports a Bundling capability of receiving retransmitted data and performing combination and decoding on the retransmitted data and previously newly transmitted or retransmitted data by using a same process within a specific time, for example, within a specific time when a timer is HARQ_RTT_Time; or indicates that the user equipment supports a Bundling capability of receiving retransmitted data and performing combination and decoding on the retransmitted data and previously newly transmitted or retransmitted data by using a same process after a specific time, for example, after four consecutive TTIs; and information about a Bundling capability of receiving newly transmitted data and retransmitted data, which indicates that the user equipment supports a Bundling capability of receiving newly transmitted data and retransmitted data by using a same process within a specific time, for example, within a specific time when a timer is HARQ_RTT_Time; or indicates that the user equipment supports a Bundling capability of receiving newly transmitted data and retransmitted data by using a same process after a specific time, for example, after four consecutive TTIs.

Specifically, the base station may learn, according to the foregoing downlink Bundling capability information, the uplink and downlink Bundling capability information, and the like, whether the user equipment has a Bundling capability in downlink.

In addition, there may be channels of multiple types in both uplink and downlink. For example, in uplink, there are channels such as a physical uplink shared channel (Physical Uplink Shared Channel, PUSCH), a physical uplink control channel (Physical Uplink Control Channel, PUCCH), and a physical random access channel (Physical Random Access Channel, PRACH); and in downlink, there are a physical downlink control channel (Physical Downlink Control Channel, PDCCH), a physical downlink shared channel (Physical Downlink Shared Channel, PDSCH), and the like, where each channel may have a different coverage capability. The base station may learn Bundling capability information, on a specific channel, of the user equipment according to the foregoing PDSCH Bundling capability information, PDCCH Bundling capability information, PRACH Bundling capability information, and the like, and perform transmission of the first data with the user equipment on the specific channel for N times, thereby achieving an effect of improving transmission reliability on the specific channel by means of Bundling.

It should be noted that the base station may learn the Bundling capability of the user equipment according to received one or a combination of the foregoing Bundling capability information sent by the user equipment. In addition, a preset rule may also be used. For example, it is preset that some user equipment can support a part or all of Bundling capabilities, the preset rule and an identifier of the user equipment are stored in the base station, so that the base station does not need to receive a report from the user equipment, but determines, according to the preset rule and the identifier of the user equipment, a Bundling capability that can be supported by the user equipment.

Optionally, in this embodiment, the base station may receive Bundling capability information that is carried in a feature group indicator and sent by the user equipment; or receive Bundling capability information that is carried in capability information and sent by the user equipment.

Specifically, the user equipment may add at least one of the foregoing Bundling capability information to the feature group indicator (FGI) and then report the feature group indicator to the base station; or may report the bundling capability information to the base station by using the capability (Capability) information. For example, one or more bits may be used to indicate at least one of the foregoing capability information. Correspondingly, the base station receives at least one of the Bundling capability information carried in the FGI or the capability information.

It should be noted that M in various kinds of the foregoing Bundling capability information indicates that the quantity of transmission times is M at most. In an actual data transmission process, a quantity of transmission times is N, where $2 \leq N \leq M$. For details, refer to step 102.

102. Perform transmission of the first data with the user equipment for N times according to the Bundling capability information, where $N \leq M$.

In this step, the base station learns, according to the received Bundling capability information of the user equipment, the Bundling capability that can be supported by the user equipment, so as to perform transmission of the first data with the user equipment for N times.

For example, if the Bundling capability information reported by the user equipment indicates that the user equipment supports both uplink and downlink Bundling, the base station receives uplink data sent by the user equipment, that is, receives a same piece of uplink data that is sent by the user equipment in N consecutive available TTIs; or receives a same piece of uplink data that is sent in different frequency domains by the user equipment for N times, where a quantity of receiving times is N; or receives a same piece of uplink data that is sent in several consecutive available TTIs and in different frequency domains by the user equipment, where the sum of a quantity of receiving times in the TTIs and a quantity of receiving times in the frequency domains is N.

Likewise, when the base station needs to send downlink data to the user equipment, the base station sends a same piece of downlink data in N consecutive available TTIs, and the user equipment receives the downlink data in these consecutive TTIs, where a quantity of sending times is N; or the base station sends a same piece of downlink data in different frequency domains, where a quantity of sending times is N; or the base station sends a same piece of downlink data in several consecutive available TTIs and in different frequency domains, where the sum of a quantity of sending times in the TTIs and a quantity of sending times in the frequency domains is N.

It should be noted that if the first data is uplink data, after receiving N pieces of uplink data, the base station may separately process each piece of uplink data, or may perform joint processing on the N pieces of uplink data, that is, process the N pieces of uplink data as an entirety. For example, combination and decoding are performed on the N piece of uplink data, and only one acknowledgement (Acknowledgement, ACK), or negative acknowledgement (Negative Acknowledgement, NACK), or the like is replied after the decoding.

Optionally, before performing transmission of the first data with the user equipment for N times, after receiving the Bundling capability information of the user equipment, the base station needs to configure a Bundling transmission parameter for the user equipment, where the Bundling transmission parameter indicates used Bundling capability information. The used Bundling capability information includes one or a combination of multiple of the bundling capability information reported by the user equipment. After configuring the used Bundling transmission parameter for the user equipment, the base station performs transmission of the first data with the user equipment for N times. For example, the Bundling capability information received by the base station includes the frequency domain Bundling capability information and the time domain Bundling capability information, and the base station configures that the UE performs only time domain bundling transmission, where a quantity of bundling times is 4, and a bundling channel is a PDSCH and the like.

It should be noted that the Bundling capability information reported by the foregoing user equipment is only a preparative action for using a Bundling manner by the base station and the user equipment, and does not limit that the base station and the user equipment need to perform data transmission in the Bundling transmission mode after the Bundling capability information reported by the user equipment is received. For example, it may be preset that the base station and the user equipment may perform data transmission on some channels in the Bundling manner, while perform data transmission on another channel and the like except the preset channels by still using a conventional technology, such as a hybrid automatic repeat request (Hybrid Automatic Repeat Request, HARQ) manner. For example, when the Bundling capability information reported by the user equipment is the time domain Bundling capability information, and it is preset that the base station and the user equipment perform data transmission in a time domain in the non-Bundling manner, even though the base station receives the time domain Bundling capability information and learns that the user equipment supports time domain Bundling, the base station performs data transmission in the time domain by still using the conventional technology.

According to the data transmission method provided in this embodiment of the present invention, in a process of transmitting a specific piece of first data, a base station performs transmission of the first data with user equipment for N times according to received Bundling capability information sent by the user equipment, that is, receives a same piece of data for N times or sends a same piece of data for N times, thereby implementing highly reliable data transmission between the base station and the user equipment.

Figure 2:
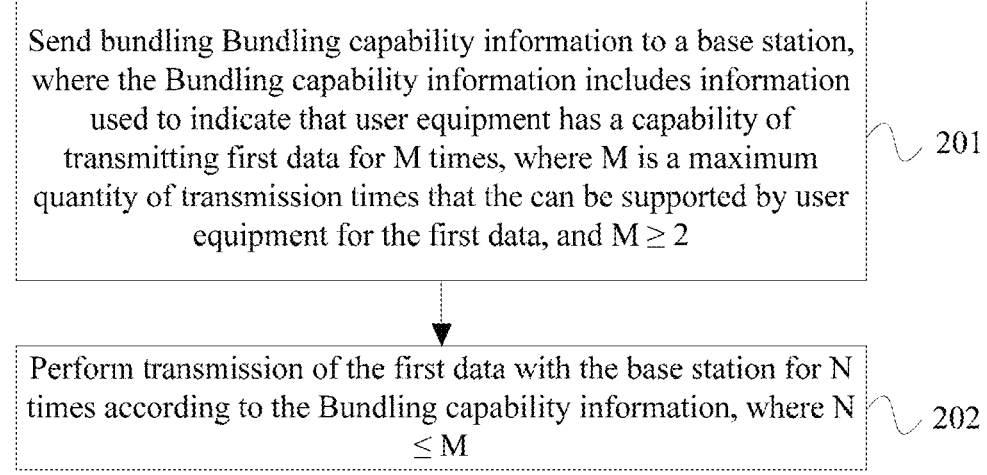
FIG. 2 is a flowchart of a second embodiment of a data transmission method according to the present invention.

FIG. 2 is a flowchart of a second embodiment of a data transmission method according to the present invention. An execution body in this embodiment is user equipment and is applicable to a scenario in which a base station cannot learn a Bundling capability of the user equipment and needs the user equipment to actively report the Bundling capability of the user equipment. Specifically, this embodiment includes the following steps:

201. Send bundling capability information to the base station, where the Bundling capability information includes: information used to indicate that the user equipment has a capability of transmitting first data for M times, where M is a maximum quantity of transmission times that is supported by the user equipment for the first data, and M≥2.

In this step, the user equipment reports the bundling capability information of the user equipment to the base station, that is, the user equipment sends the information about a bundling capability supported by the user equipment to the base station.

Optionally, in this embodiment, the Bundling capability information includes the following information:

at least one or a combination of downlink Bundling capability information, uplink and downlink Bundling capability information, physical downlink shared channel PDSCH Bundling capability information, physical downlink control channel PDCCH Bundling capability information, information about a quantity of transmission times, physical random access channel PRACH Bundling capability information, time domain Bundling capability information, frequency domain Bundling capability information, information about a Bundling capability of receiving new data, information about a Bundling capability of receiving retransmitted data, information about a Bundling capability of receiving retransmitted data and performing combination and decoding on the retransmitted data and previously newly transmitted or retransmitted data, and information about a Bundling capability of receiving newly transmitted data and retransmitted data.

Specifically, for the foregoing various Bundling capabilities, reference may be made to the description of the foregoing first embodiment, and details are not described herein again.

Optionally, in this embodiment, the user equipment sends, to the base station, Bundling capability information carried in a feature group indicator; or sends, to the base station, Bundling capability information carried in capability information, thereby reporting the Bundling capability of the user equipment to the base station.

For details, refer to the description of the foregoing first embodiment, and details are not described herein again.

202. Perform transmission of the first data with the base station for N times according to the Bundling capability information, where N≤M.

In this step, the base station performs data transmission with the user equipment in a Bundling manner. That is, in a process of transmitting a specific piece of first data, if the first data is uplink data, the base station can at most receive the first data for M times; and if the first data is downlink data, the base station can at most send the first data for M times. For details, refer to step 102 in FIG. 1, and details are not described herein again.

Optionally, after sending the bundling capability information to the base station and before performing data transmission with the base station in the Bundling manner according to the Bundling capability information, the user equipment receives a Bundling transmission parameter sent by the base station, where the Bundling transmission parameter indicates used Bundling capability information. The used Bundling capability information is configured by the base station for the user equipment according to the bundling capability information reported by the user equipment. After configuring the Bundling transmission parameter for the user equipment, the base station performs data transmission with the user equipment in the Bundling manner. For example, the Bundling capability information received by the base station includes the frequency domain Bundling capability information and the time domain Bundling capability information, and the base station configures that the UE performs only time domain bundling transmission, where a quantity of bundling times is 4, and a bundling channel is a PDSCH and the like.

According to the data transmission method provided in this embodiment of the present invention, user equipment reports a Bundling capability supported by the user equipment to a base station, so that in a process of transmitting a specific piece of first data, the base station transmits the first data for N times according to received Bundling capability information sent by the user equipment, that is, receives a same piece of data for N times or sends a same piece of data for N times, thereby implementing highly reliable data transmission between the base station and the user equipment.

Figure 3:
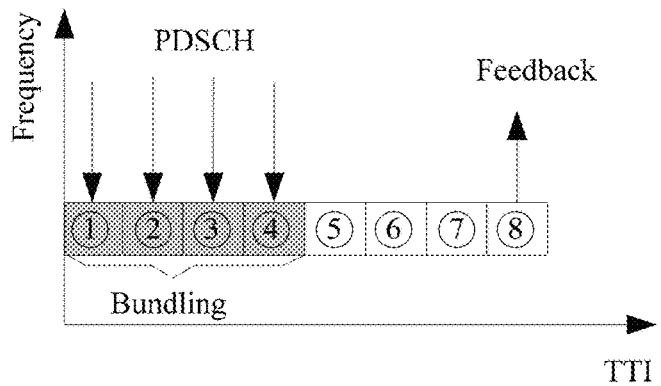
FIG. 3 is a schematic diagram of data bundling in a third embodiment of a data transmission method according to the present invention.

FIG. 3 is a schematic diagram of data bundling in a third embodiment of a data transmission method according to the present invention. In this embodiment, Bundling capability information sent by user equipment to a base station includes PDSCH Bundling capability information, where first data includes a first PDSCH data. In this case, the base station sends the first PDSCH data to the user equipment for N times. Correspondingly, the user equipment receives, for N times, the first PDSCH data sent by the base station.

Specifically, referring to FIG. 3, a horizontal coordinate represents a TTI, and a vertical coordinate represents frequency (Frequency), where ① to ⑧ represent eight consecutive TTIs. When the user equipment reports that the user equipment supports PDSCH Bundling, the base station sends the first PDSCH data to the user equipment for N times. For example, as shown in a shaded part in FIG. 3, the base station sends a same piece of PDSCH data in four consecutive TTIs ① to ④, and the user equipment receives downlink data on the PDSCH according to a scheduling command, for example, downlink control information (Downlink Control Information, DCI), that is, the user equipment receives the same piece of downlink data for four times. Therefore, reliability of data transmission on a PDSCH channel can be improved by using this method.

In addition, in this embodiment, after the user equipment completes receiving PDSCH data in the four consecutive TTIs ① to ④, in a possible implementation manner, the user equipment may determine, according to the last TTI, a feedback (Feedback) moment to send a feedback. For example, the user equipment may send a feedback in a TTI with a distance of four TTIs from the last TTI, that is, send a feedback in a TTI obtained by the last TTI, in a quantity of transmission times, plus four TTIs, for example, TTI ⑧ shown in the figure. The user equipment may also send a feedback, in another manner, in response to the same piece of PDSCH data received in the four consecutive TTIs, which is not construed as a limitation to the present invention.

It should be noted that in this embodiment, an example in which a same piece of PDSCH data is sent in four consecutive TTIs is used to describe the present invention in detail. However, the present invention constitutes no limitation thereto. In another possible implementation manner, a quantity of consecutive TTIs, that is, a quantity of transmission times, N, of a same piece of PDSCH data, may be selected according to a preset rule; or the base station may select a quantity of transmission times, N, according to a quantity of transmission times that is reported by the user equipment.

In a fourth embodiment of a data transmission method according to the present invention, Bundling capability information sent by user equipment to a base station includes: PDCCH Bundling capability information and PDSCH Bundling capability information, that is, the user equipment reports to the base station that the user equipment supports both a PDCCH Bundling capability and a PDSCH Bundling capability. In this case, first data includes second PDCCH data and second PDSCH data. The base station sends the second PDCCH data and the second PDSCH data to the user equipment for N times. Correspondingly, the user equipment receives, for N times, a second PDCCH data and a second PDSCH data that are simultaneously sent by the base station.

Specifically, when the user equipment supports both PDCCH Bundling and PDSCH Bundling, in an example in which N=4, if transmission is performed in two TTIs, the second PDCCH and the second PDSCH are sent in a first TTI, and the second PDCCH and the second PDSCH are resent in a second TTI; if transmission is performed in four TTIs, the second PDCCH may be transmitted in a first TTI and a third TTI, and the second PDSCH is transmitted in a second TTI and a fourth TTI. In this embodiment, the second PDCCH and the second PDSCH are sent to the user equipment in multiple consecutive TTIs for multiple times, and therefore, reliability of data transmission on a PDCCH channel and a PDSCH channel is improved.

Figure 4:
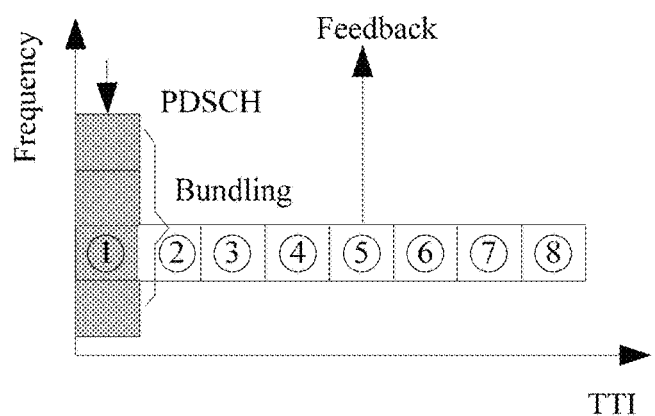
FIG. 4 is a schematic diagram of data bundling in a fifth embodiment of a data transmission method according to the present invention.

FIG. 4 is a schematic diagram of data bundling in a fifth embodiment of a data transmission method according to the present invention. In this embodiment, Bundling capability information sent by user equipment to a base station includes frequency domain Bundling capability information. In this case, an actual quantity of transmission times, N, of first data is specifically a quantity of transmission times, in a first frequency domain, of the first data. That is, the base station sends the first data to the user equipment in a same transmission time interval TTI for N times. Correspondingly, the user equipment receives, in the same time interval for N times, the first data sent by the base station. Alternatively, the user equipment sends the first data in a same time interval for N times. Correspondingly, the base station receives the first data in the same transmission time interval TTI for N times.

Specifically, referring to FIG. 4, a horizontal coordinate represents a TTI, and a vertical coordinate represents frequency (Frequency), where ① to ⑧ represent eight consecutive TTIs. When the user equipment reports that the user equipment supports a frequency domain Bundling capability, the base station may send a same piece of data, for example, a PDSCH data in the figure, to the user equipment in a same TTI for N times. For example, in a shaded part of FIG. 4, the base station sends a same piece of PDSCH data in a TTI ① for four times, and the user equipment receives downlink data on a PDSCH according to a scheduling command, for example, downlink control information (Downlink Control Information, DCI), that is, the user equipment receives the same piece of downlink data in the same TTI for four times. Therefore, reliability of data transmission in a frequency domain can be improved by using this method.

In addition, in this embodiment, after receiving a same piece of data in a same TTI for four times, the user equipment determines a feedback (Feedback) moment to send a feedback, for example, may send a feedback in a TTI ⑤.

In a sixth embodiment of a data transmission method according to the present invention, Bundling capability information sent by user equipment to a base station is specifically PRACH Bundling capability information. First data may be a preamble allocated by the base station to the user equipment, and the user equipment sends the preamble for N times. Correspondingly, the base station receives the preamble for N times. For details, refer to FIG. 5A.

Figure 5A:
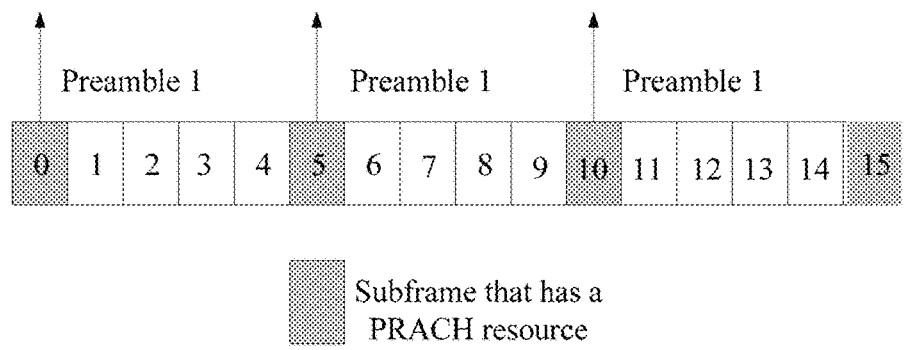
FIG. 5A is a schematic diagram of data bundling in a sixth embodiment of a data transmission method according to the present invention.

FIG. 5A is a schematic diagram of data bundling in the sixth embodiment of the data transmission method according to the present invention. As shown in FIG. 5A, 0 to 15 represent 16 subframes, where a subframe indicated by a shaded part, such as a subframe 0, 5, 10, or 15, represents a subframe that has a PRACH resource. When the user equipment reports to the base station that the user equipment has a PRACH Bundling capability, and N=3, the base station instructs the user equipment to send the preamble, for example, a preamble 1 in the figure, for three times in TTIs 0, 5, and 10, which are N adjacent subframes 0, 5, and 10 that start from a system frame number 0 and have PRACH resources. Correspondingly, the base station receives the same preamble 1 for three times in subframes 0, 5, and 10. In a process of sending the preamble, a PRACH resource corresponding to a quantity of transmission times may be periodically configured by the base station. Therefore, reliability of transmitting a random access preamble can be improved by using this method.

In FIG. 5A, this embodiment of the present invention is described in detail from a perspective of the quantity of data transmission times when the user equipment supports PRACH Bundling. The following describes the present invention in detail by using a specific process of PRACH Bundling.

Specifically, if the user equipment reports to the base station that the user equipment supports the PRACH Bundling capability, a Bundling transmission parameter configured by the base station for the user equipment indicates that the user equipment can use an PRACH Bundling capability. In this case, the base station configures a PRACH resource Bundling parameter for the user equipment and sends the PRACH resource bundling parameter to the user equipment, and the user equipment receives and stores the PRACH resource Bundling parameter. Then, when the base station needs to perform transmission of the preamble with the user equipment for N times, the user equipment sends the preamble for N times according to the PRACH resource Bundling parameter. Correspondingly, the base station receives the preamble for N times on a corresponding PRACH resource.

Generally, the PRACH resource Bundling parameter configured by the base station for the user equipment includes at least one of the following parameters: at least one quantity of transmission times, a PRACH resource corresponding to each quantity of transmission times, a preamble corresponding to each quantity of transmission times, and a start location of a PRACH corresponding to each quantity of transmission times. The at least one quantity of transmission times may be configured by the base station for the user equipment according to a requirement and may be used by the user equipment to select one from the at least one quantity of transmission times as a specific quantity of transmission times. The preamble corresponding to the quantity of transmission times may be a preamble set, where the preamble set includes at least one preamble. The start location of the PRACH may be, for example, a start location of the PRACH resource, or a parameter that represents the start location.

In the PRACH resource Bundling parameter configured by the foregoing base station for the user equipment, when the PRACH resource Bundling parameter includes multiple quantities of transmission times, the PRACH resource Bundling parameter may further include a selection criterion corresponding to each quantity of transmission times, for example, a correspondence between a quantity of transmission times and a path loss threshold. For example, when a specific path loss threshold or path loss threshold interval is met, a corresponding quantity of transmission times and another parameter are selected. Specifically, the PRACH resource Bundling parameter may be sent to the user equipment by using a system broadcast message, a dedicated radio resource control (Radio Resource Control, RRC) message, a Medium Access Control (Medium Access Control, MAC) message, a physical layer message, or the like, so as to configure a parameter related to PRACH Bundling transmission for the user equipment.

In the foregoing embodiment, when the base station configures one quantity of transmission times for the user equipment, that is, configures one specific quantity of transmission times for the user equipment, the specific quantity of transmission times is N. The user equipment sends the preamble only according to the specific quantity of transmission times. For example, information, about a quantity of transmission times, reported by the user equipment indicates that the user equipment can support quantities of transmission times, 2, 3, 4, and 5, the base station may select the preamble as 2 for a user according to an environment in which the user equipment is located, a resource usage status of the base station, and the like. In this process, the base station configures a proper value of N for the user equipment.

In the foregoing embodiment, when the base station configures multiple quantities of transmission times for the user equipment, after the base station sends the PRACH resource Bundling parameter to the user equipment, the user equipment selects a proper value of N. Specifically, after receiving Bundling capability information that includes multiple quantities of transmission times and is reported by the user equipment, the base station configures some quantities of transmission times for the user equipment and configures a PRACH resource and a preamble that are corresponding to each quantity of transmission times. Then, after the user equipment receives the PRACH resource Bundling parameter, the user equipment selects a proper value of N. For example, the information, about the quantity of transmission times, reported by the user equipment indicates that the user equipment supports the quantities of transmission times, 2, 3, 4, and 5, the base station configures, for the user equipment, 2 and 3 as the quantities of transmission times, a PRACH resource and a preamble that are corresponding to the quantity of transmission times, 2, and a PRACH resource and a preamble that are corresponding to the quantity of transmission times, 3. After receiving the PRACH resource Bundling parameter, when the user equipment needs to send a preamble, the user equipment may determine N according to the received PRACH resource Bundling parameter, an environment in which the user equipment is located, and the like, then determine a PRACH resource and a preamble that are corresponding to N, and send the preamble. In this process, the user equipment selects a proper value of N by itself.

In addition, it may be understood that the base station may also not need to obtain a PRACH bundling capability of the user equipment, that is, does not need to receive the PRACH bundling capability reported by the user equipment, but only notifies the user equipment of the foregoing PRACH bundling parameter, such as one or a combination of: at least one quantity of transmission times, a PRACH resource corresponding to the quantity of transmission times, a preamble corresponding to the quantity of transmission times, a start location of a PRACH, and a criterion parameter used by the user equipment to select the quantity of transmission times. After receiving the PRACH resource Bundling parameter, when the user equipment needs to send a preamble, the user equipment may determine N according to the received PRACH resource Bundling parameter, an environment in which the user equipment is located, and the like, then determine a PRACH resource and a preamble that are corresponding to N, and send the preamble.

Further, the PRACH resource Bundling parameter further includes a transmission mode of the preamble corresponding to each quantity of transmission times. Specifically, in this embodiment, the preamble corresponding to the quantity of transmission times may be transmitted in the following two Bundling manners:

Manner 1: The preamble is transmitted on the PRACH resource corresponding to the quantity of transmission times.

Specifically, the base station may allocate a part of a PRACH resource of a subframe that has a PRACH resource to the user equipment, where the part of the PRACH is used as the PRACH resource corresponding to the quantity of transmission times, so that the preamble corresponding to the quantity of transmission times is transmitted on only the PRACH resource, that is, the base station performs transmission of the preamble with the user equipment on the PRACH resource corresponding to the quantity of transmission times. For details, refer to FIG. 5B.

Figure 5B:
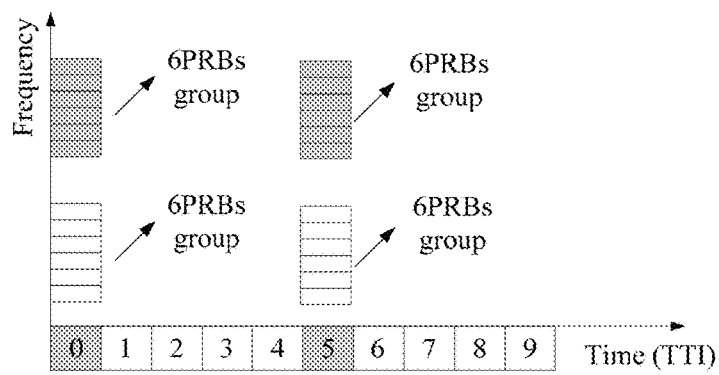
FIG. 5B is a schematic diagram of preamble transmission in a data transmission method according to the present invention.

FIG. 5B is a schematic diagram of preamble transmission in a data transmission method according to the present invention. As shown in FIG. 5B, a subframe 0 and a subframe 5: a TTI 0 and a TTI 5, have PRACH resources. In a frequency domain (which is shown by a vertical coordinate), these PRACH resources are divided, in a unit of six physical resource blocks (Physical Resource Block, PRB), into multiple PRB groups. For example, in the TTI 0 or the TTI 5, a gray part is a PRB group, and an unfilled part is another PRB group. When N=2, the base station may allocate only PRACH resources corresponding to PRB groups in gray parts to the user equipment as PRACH resources corresponding to an actual quantity of transmission times, and transmit a preamble for two times on these PRACH resources.

Manner 2: The preamble is transmitted on a PRACH resource except the PRACH resource corresponding to the quantity of transmission times.

Specifically, the base station may not allocate the PRACH resource corresponding to the quantity of transmission times to the user equipment, but transmits the preamble corresponding to the quantity of transmission times on the PRACH resource except the PRACH resource corresponding to the quantity of transmission times. Still referring to FIG. 5B, a preamble transmitted by using a conventional technology or some preambles in a preamble set transmitted by using a conventional technology are transmitted on PRACH resources corresponding to unfilled PRB groups, and the preamble set transmitted by using the conventional technology is, for example, 1 to N (it is assumed that N≤64). In order that the PRACH resources can be shared with the preamble transmitted by using the conventional technology, a preamble set that is corresponding to a quantity of transmission times needs to be set differently from the preamble set that is transmitted by using the conventional technology, for example, N+1 to 64. Therefore, the preamble corresponding to the quantity of transmission times shares the PRACH resources with the preamble transmitted by using the conventional technology. That is, the preamble corresponding to the quantity of transmission times may also be transmitted on the PRACH resources corresponding to the unfilled PRB groups in the figure.

Further, when transmission of the preamble with the user equipment is performed for N times, the present invention constitutes no limitation to a TTI that has a PRACH resource and from which the user equipment specifically starts to send the preamble corresponding to a quantity of Bundling times. For example, still referring to FIG. 5B, in this embodiment, a subframe 0 whose system frame number (SFN) is 0 is used as a start point, each two subframes that have PRACH resources are used as one Bundling unit, and the preamble is sent for two times in the two subframes in the Bundling unit.

Further, after the base station configures at least one quantity of transmission times and a related parameter for the user equipment, a basis on which the UE selects N may be, for example, a path loss threshold. When the user equipment supports multiple quantities of transmission times, multiple path loss thresholds may be set.

Specifically, when the user equipment needs to send a preamble, the base station may select a proper value of N for the user equipment with reference to a capability of the user equipment and the path loss threshold. For example, when quantities of Bundling times supported by the UE are 2 and 3, the base station configures a path loss threshold corresponding to the quantity of transmission times, 2, as X, and configures a path loss threshold corresponding to the quantity of transmission times, 3, as Y. If a path loss is less than X, N configured for the user equipment is 2; and if the path loss is greater than X, N configured for the user equipment is 3.

When the user equipment sends a preamble in the foregoing manner 1, the user equipment sends the preamble for N times according to N on a PRACH resource corresponding to a quantity of transmission times. Correspondingly, the base station receives the preamble for N times on the PRACH resource corresponding to the quantity of transmission times.

When the user equipment sends a preamble in the foregoing manner 2, the user equipment sends the preamble on a PRACH resource except a PRACH resource corresponding to a quantity of transmission times. Correspondingly, the base station receives the preamble on the PRACH resource except the PRACH resource corresponding to the quantity of transmission times.

Further, after receiving the preamble sent by the user equipment according to a PRACH resource Bundling parameter, the base station performs joint processing on the N received preambles, that is, processes the N preambles as an entirety, obtains a random access response, and sends the random access response to the user equipment, instead of replying a random access response for each received preamble.

Figure 6:
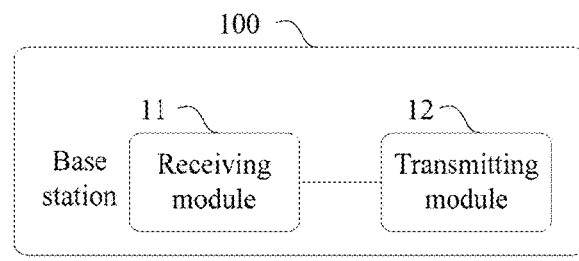
FIG. 6 is a schematic structural diagram of a first embodiment of a base station according to the present invention.

FIG. 6 is a schematic structural diagram of a first embodiment of a base station according to the present invention. The base station provided in this embodiment can implement steps of a method that is applied to a base station and provided in any embodiment of the present invention. Specifically, a base station 100 provided in this embodiment specifically includes:

a receiving module 11, configured to receive bundling capability information sent by user equipment, where the Bundling capability information includes: information used to indicate that the user equipment has a capability of transmitting first data for M times, where M is a maximum quantity of transmission times that is supported by the user equipment for the first data, and M≥2; and a transmitting module 12, configured to perform transmission of the first data with the user equipment for N times according to the Bundling capability information received by the receiving module, where N≤M.

The base station provided in this embodiment of the present invention determines, according to received Bundling capability information sent by user equipment, a Bundling capability that can be supported by the user equipment, and performs data transmission with the user equipment, thereby achieving high reliability of data transmission between the base station and the user equipment.

The Bundling capability information received by the receiving module 11 includes physical downlink shared channel PDSCH Bundling capability information;

the first data includes first PDSCH data; and the transmitting module 12 is configured to send the first PDSCH data to the user equipment for N times.

Further, the Bundling capability information received by the receiving module 11 includes physical downlink control channel PDCCH Bundling capability information and physical downlink shared channel PDSCH Bundling capability information;

the first data includes second PDCCH data and second PDSCH data; and the transmitting module 12 is configured to send the second PDCCH data and the second PDSCH data to the user equipment for N times.

Further, the Bundling capability information received by the receiving module 11 includes frequency domain Bundling capability information;

N is specifically a quantity of transmission times, in a first frequency domain, of the first data; and the transmitting module 12 is configured to perform transmission of the first data with the user equipment in the first frequency domain for N times.

Further, the Bundling capability information received by the receiving module 11 includes physical random access channel PRACH Bundling capability information;

the first data includes a preamble; and the transmitting module 12 is configured to receive, for N times, the preamble sent by the user equipment.

Figure 7:
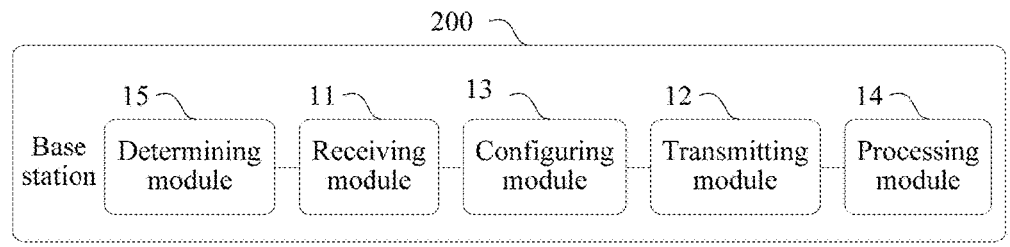
FIG. 7 is a schematic structural diagram of a second embodiment of a base station according to the present invention.

FIG. 7 is a schematic structural diagram of a second embodiment of a base station according to the present invention. As shown in FIG. 7, based on a structure of the base station shown in FIG. 6, a base station 200 in this embodiment further includes:

a configuring module 13, configured to configure a PRACH resource Bundling parameter for the user equipment, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M; and the transmitting module 12 is configured to send the PRACH resource Bundling parameter to the user equipment, where:

the at least one quantity of transmission times is used by the user equipment to select one from the at least one quantity of transmission times as N.

Further, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured; and each quantity of transmission times is corresponding to at least one preamble.

Further, the PRACH resource Bundling parameter further includes a transmission mode of the preamble corresponding to the quantity of transmission times, where the transmission mode includes:

transmitting the preamble on the PRACH resource corresponding to the quantity of transmission times; or transmitting the preamble on a PRACH resource except the PRACH resource corresponding to the quantity of transmission times.

Still referring to FIG. 7, further, the base station 200 further includes:

a processing module 14, configured to perform joint processing on the N received preambles, where the joint processing is processing the N preambles as an entirety; and the transmitting module 12 is further configured to send a random access response to the user equipment.

Further, the receiving module 11 is configured to: receive Bundling capability information that is carried in a feature group indicator and sent by the user equipment; or receive Bundling capability information that is carried in capability information and sent by the user equipment.

Still referring to FIG. 7, further, the base station 200 further includes:

a determining module 15, configured to determine N according to the Bundling capability information and a preset policy; or configured to determine one quantity of transmission times as N according to M and at least one corresponding quantity of transmission times that is less than M, where M and the at least one corresponding quantity of transmission times that is less than M are included in the Bundling capability information; and the transmitting module 12 is configured to perform transmission of the first data with the user equipment for N times according to N determined by the determining module.

Figure 8:
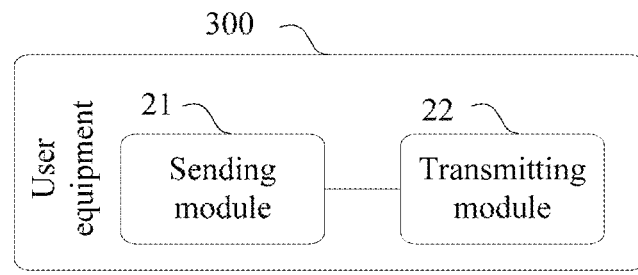
FIG. 8 is a schematic structural diagram of a first embodiment of user equipment according to the present invention.

FIG. 8 is a schematic structural diagram of a first embodiment of user equipment according to the present invention. The user equipment provided in this embodiment can implement steps of a method that is applied to user equipment and provided in any embodiment of the present invention. Specifically, user equipment 300 provided in this embodiment specifically includes:

a sending module 21, configured to send bundling capability information to a base station, where the Bundling capability information includes: information used to indicate that the user equipment has a capability of transmitting first data for M times, where M is a maximum quantity of transmission times that is supported by the user equipment for the first data, and M≥2; and a transmitting module 22, configured to perform transmission of the first data with the base station for N times according to the Bundling capability information sent by the sending module, where N≤M.

According to the user equipment provided in this embodiment of the present invention, the user equipment reports a Bundling capability supported by the user equipment to a base station, so that a base station determines, according to received Bundling capability information sent by the user equipment, the Bundling capability that can be supported by the user equipment, and performs data transmission with the user equipment, thereby achieving high reliability of data transmission between the base station and the user equipment.

Further, the Bundling capability information sent by the sending module 21 includes physical downlink shared channel PDSCH Bundling capability information;

the first data includes first PDSCH data; and the transmitting module 22 is configured to receive, for N times, the first PDSCH data sent by the base station.

Further, the Bundling capability information sent by the sending module 21 includes physical downlink control channel PDCCH Bundling capability information and physical downlink shared channel PDSCH Bundling capability information;

the first data includes second PDCCH data and second PDSCH data; and the transmitting module 22 is configured to receive, for N times, the second PDCCH data and the second PDSCH data that are sent by the base station.

Further, the Bundling capability information sent by the sending module 21 includes frequency domain Bundling capability information;

N is specifically a quantity of transmission times, in a first frequency domain, of the first data; and the transmitting module 22 is configured to perform transmission of the first data with the base station in the first frequency domain for N times.

Further, the Bundling capability information sent by the sending module 21 includes physical random access channel PRACH Bundling capability information;

the first data includes a preamble; and the transmitting module 22 is configured to send the preamble to the base station for N times.

Figure 9:
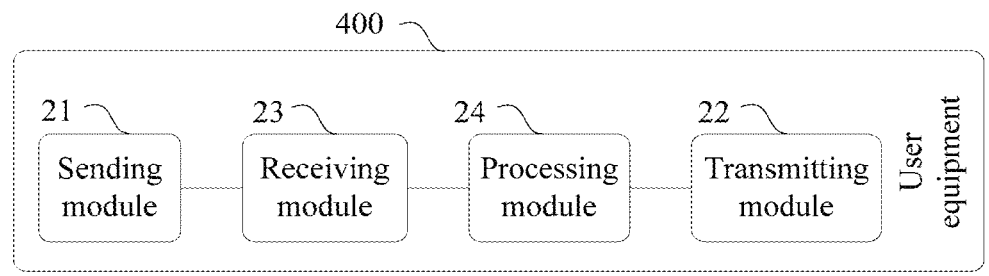
FIG. 9 is a schematic structural diagram of a second embodiment of user equipment according to the present invention.

FIG. 9 is a schematic structural diagram of a second embodiment of user equipment according to the present invention. As shown in FIG. 9, based on a structure of the user equipment shown in FIG. 8, user equipment 400 in this embodiment further includes:

a receiving module 23, configured to receive a PRACH resource Bundling parameter sent by the base station, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M; and a processing module 24, configured to select N from the at least one quantity of transmission times according to the PRACH resource Bundling parameter; and the transmitting module 22 is configured to send, to the base station for N times according to N, a preamble corresponding to N.

Further, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured by the base station; and each quantity of transmission times is corresponding to at least one preamble.

Further, the processing module 24 is configured to select N from the at least one quantity of transmission times according to a path loss threshold.

Further, the transmitting module 22 is configured to: send, for N times according to N, the preamble on a PRACH resource corresponding to N; or send, for N times according to N, the preamble on a PRACH resource except a PRACH resource corresponding to N.

Further, the receiving module 23 is further configured to receive a random access response sent by the base station.

Further, the sending module 21 is configured to: send, to the base station, Bundling capability information carried in a feature group indicator; or send, to the base station, Bundling capability information carried in capability information.

Figure 10:
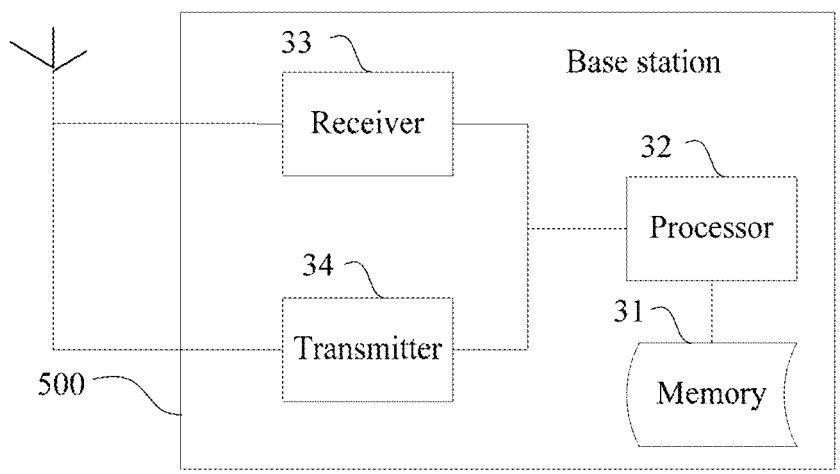
FIG. 10 is a schematic structural diagram of a third embodiment of a base station according to the present invention.

FIG. 10 is a schematic structural diagram of a third embodiment of a base station according to the present invention. As shown in FIG. 10, a base station 500 provided in this embodiment includes a memory 31, a processor 32, a receiver 33, and a transmitter 34.

The memory 31 is configured to store code of a data transmission method.

The processor 32 is configured to execute the code stored in the memory 31 and control the receiver 33 to receive bundling capability information sent by user equipment, where the Bundling capability information indicates a Bundling capability supported by the user equipment.

The processor 32 is further configured to control, according to the Bundling capability information received by the receiver 33, the receiver 33 or the transmitter 34 to perform data transmission with the user equipment.

The base station provided in this embodiment can implement steps of a method that is applied to a base station and provided in any embodiment of the present invention, and implementation principles and technical effects of the base station are similar and are not described herein again.

The Bundling capability information received by the receiver 33 includes physical downlink shared channel PDSCH Bundling capability information;

first data includes first PDSCH data; and the transmitter 34 is configured to send the first PDSCH data to the user equipment for N times.

Further, the Bundling capability information received by the receiver 33 includes physical downlink control channel PDCCH Bundling capability information and physical downlink shared channel PDSCH Bundling capability information;

first data includes second PDCCH data and second PDSCH data; and the transmitter 34 is configured to send the second PDCCH data and the second PDSCH data to the user equipment for N times.

Further, the Bundling capability information received by the receiver 33 includes frequency domain Bundling capability information;

N is specifically a quantity of transmission times, in a first frequency domain, of first data; and the receiver 33 or the transmitter 34 is configured to perform transmission of the first data with the user equipment in the first frequency domain for N times.

Further, the Bundling capability information received by the receiver 33 includes physical random access channel PRACH Bundling capability information;

first data includes a preamble; and the receiver 33 is configured to receive, for N times, the preamble sent by the user equipment.

Further, the processor 32 is further configured to execute the code stored in the memory 31 and configure a PRACH resource Bundling parameter for the user equipment, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M; and the transmitter 34 is configured to send the PRACH resource Bundling parameter to the user equipment, where:

the at least one quantity of transmission times is used by the user equipment to select one from the at least one quantity of transmission times as N.

Further, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured; and each quantity of transmission times is corresponding to at least one preamble.

Further, the PRACH resource Bundling parameter further includes a transmission mode of the preamble corresponding to the quantity of transmission times, where the transmission mode includes:

transmitting the preamble on the PRACH resource corresponding to the quantity of transmission times; or transmitting the preamble on a PRACH resource except the PRACH resource corresponding to the quantity of transmission times.

Further, the processor 32 is further configured to execute the code stored in the memory 31 and perform joint processing on the N received preambles, where the joint processing is processing the N preambles as an entirety; and the transmitter 34 is further configured to send a random access response to the user equipment.

Further, the receiver 33 is configured to: receive Bundling capability information that is carried in a feature group indicator and sent by the user equipment; or receive Bundling capability information that is carried in capability information and sent by the user equipment.

Further, the processor 32 is further configured to execute the code stored in the memory 31, and determine N according to the Bundling capability information and a preset policy; or determine one quantity of transmission times as N according to M and at least one corresponding quantity of transmission times that is less than M, where M and the at least one corresponding quantity of transmission times that is less than M are included in the Bundling capability information; and the receiver 33 or the transmitter 34 is configured to perform transmission of the first data with the user equipment for N times according to N determined by the determining module.

Figure 11:
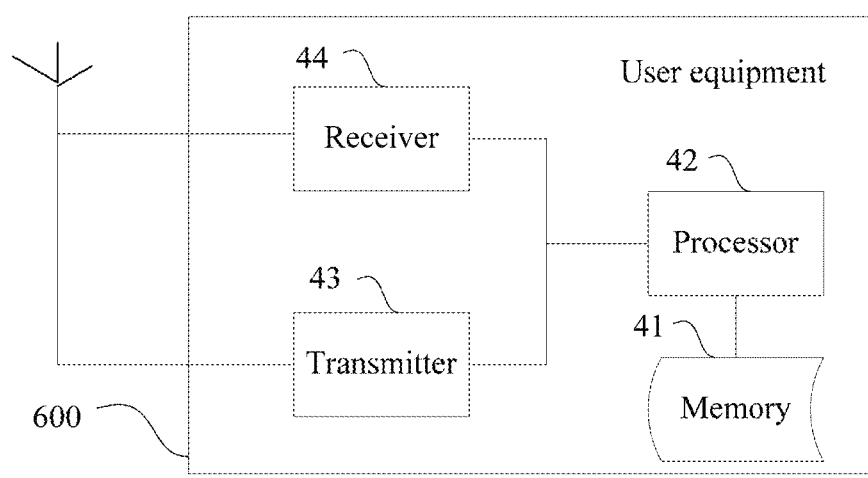
FIG. 11 is a schematic structural diagram of a third embodiment of user equipment according to the present invention.

FIG. 11 is a schematic structural diagram of a third embodiment of user equipment according to the present invention. As shown in FIG. 11, user equipment 600 provided in this embodiment includes a memory 41, a processor 42, a transmitter 43, and a receiver 44.

The memory 41 is configured to store code of a data transmission method.

The processor 42 is configured to execute the code stored in the memory 41 and control the transmitter 43 to send bundling capability information to a base station.

The processor 42 is further configured to control, according to the Bundling capability information sent by the transmitter 43, the transmitter 43 or the receiver 44 to perform data transmission with the base station.

The user equipment provided in this embodiment can implement steps of a method that is applied to user equipment and provided in any embodiment of the present invention, and implementation principles and technical effects of the user equipment are similar and are not described herein again.

Further, the Bundling capability information sent by the transmitter 43 includes physical downlink shared channel PDSCH Bundling capability information;

first data includes first PDSCH data; and the receiver 44 is configured to receive, for N times, the first PDSCH data sent by the base station.

Further, the Bundling capability information sent by the transmitter 43 includes physical downlink control channel PDCCH Bundling capability information and physical downlink shared channel PDSCH Bundling capability information;

first data includes second PDCCH data and second PDSCH data; and the receiver 44 is configured to receive, for N times, the second PDCCH data and the second PDSCH data that are sent by the base station.

Further, the Bundling capability information sent by the transmitter 43 includes frequency domain Bundling capability information;

N is specifically a quantity of transmission times, in a first frequency domain, of first data; and the receiver 44 is configured to perform transmission of the first data with the base station in the first frequency domain for N times.

Further, the Bundling capability information sent by the transmitter 43 includes physical random access channel PRACH Bundling capability information;

first data includes a preamble; and the receiver 44 is configured to send the preamble to the base station for N times.

Further, the receiver 44 is configured to receive a PRACH resource Bundling parameter sent by the base station, where the PRACH resource Bundling parameter includes at least one of the following parameters:

at least one quantity of transmission times, a PRACH resource corresponding to each quantity of transmission times, a preamble corresponding to each quantity of transmission times, and a start location of the PRACH resource corresponding to each quantity of transmission times, where each quantity of transmission times is less than or equal to M;

N is selected from the at least one quantity of transmission times according to the PRACH resource Bundling parameter; and the transmitter 43 is configured to send, to the base station for N times according to N, a preamble corresponding to N.

Further, the start location of each PRACH resource is a subframe that starts from a system frame number 0 and has a PRACH resource;

PRACH resources are adjacent subframes that start from the start location and have PRACH resources and whose quantity is equal to a quantity of transmission times that is corresponding to the PRACH resources, where the PRACH resources are periodically configured by the base station; and each quantity of transmission times is corresponding to at least one preamble.

Further, the processor 42 is further configured to execute the code stored in the memory 41, and select N from the at least one quantity of transmission times according to a path loss threshold.

Further, the transmitter 43 is configured to: send, for N times according to N, the preamble on a PRACH resource corresponding to N; or send, for N times according to N, the preamble on a PRACH resource except a PRACH resource corresponding to N.

Further, the receiver 44 is further configured to receive a random access response sent by the base station.

Further, the transmitter 43 is configured to: send, to the base station, Bundling capability information carried in a feature group indicator; or send, to the base station, Bundling capability information carried in capability information.

A person of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method, comprising:
in response to receiving bundling capability information sent by a user equipment, transmitting, by a base station, a Physical Random Access Channel (PRACH) bundling parameters notification to the user equipment, wherein the Bundling capability information comprises: information indicating that the user equipment has a maximum capability of transmitting specific data for M times, wherein M is a maximum quantity of transmission times that is supported by the user equipment for the data, and M is greater than or equal to 2, and wherein the notification comprises information indicating:
a quantity of transmission times N for which a specific preamble is to be transmitted by the user equipment to the base station, N being less than or equal to M,
a PRACH resource for transmitting the specific preamble N times, and
a criterion parameter for the user equipment to set the quantity of transmission times N for transmitting the specific preamble to the base station; and
receiving, by the base station, the specific preamble sent by the user equipment, wherein the specific preamble is transmitted by the user equipment for N times on the PRACH resource.

2. The method according to claim 1, wherein the notification further indicates a start location of the PRACH.

3. The method according to claim 1, further comprising determining the transmission times N based on a receiving power of the user equipment or based on a path loss threshold.

4. The method according to claim 1, further comprising performing, at the base station, joint processing on the specific preamble transmitted for N times.

5. The method according to claim 1, wherein after receiving the specific preamble, the method further comprises transmitting, by the base station, a random access response to the user equipment.

6. A data transmission method, comprising:
transmitting bundling capability information by a user equipment to a base station, wherein the bundling capability information comprises: information indicating that the user equipment has a maximum capability of transmitting specific data for M times, wherein M is a maximum quantity of transmission times that is supported by the user equipment for the data, and M is greater than or equal to 2;
receiving, by a user equipment, a Physical Random Access Channel (PRACH) bundling parameter notification send by a base station, wherein the notification comprises information indicating:

a quantity of transmission times N for which a specific preamble is to be transmitted by the user equipment to the base station, N being less than or equal to M, a PRACH resource for transmitting the specific preamble N times, and a criterion parameter for the user equipment to set the quantity of transmission times N for transmitting the specific data to the base station;

determining, by the user equipment, a transmitting time N' of the specific preamble, wherein the transmitting time N' is determined according to at least one of the following: receiving power of the user equipment, a path loss threshold and the PRACH bundling parameter notification;

transmitting, by the user equipment, the specific preamble to the base station of N' times on the PRACH resource.

7. The method according to claim 6, wherein before the transmitting, by the user equipment, the specific preamble to the base station of N times on the PRACH resource, further comprises:

determining, by the user equipment, the PRACH resource.

8. The method according to claim 6, wherein before the transmitting, by the user equipment, the specific preamble to the base station of N times on the PRACH resource, further comprises:

determining, by the user equipment, the preamble.

9. The method according to claim 6, wherein the notification further indicates a start location of the PRACH.

10. The method according to claim 6, wherein after transmitting the specific preamble to the base station, the method further comprises: receiving, by the user equipment, a random access response from the base station.

11. A base station, comprising:

a transmitter, configured to in response to receiving bundling capability information sent by a user equipment, transmit a Physical Random Access Channel (PRACH) bundling parameters notification to a user equipment, wherein the Bundling capability information comprises: information indicating that the user equipment has a maximum capability of transmitting specific data for M times, wherein M is a maximum quantity of transmission times that is supported by the user equipment for the data, and M is greater than or equal to 2, and wherein the notification comprises information indicating:

a quantity of transmission times N for which a specific preamble is to be transmitted by the user equipment to the base station, N being less than or equal to M, a PRACH resource for transmitting the specific preamble N times, and a criterion parameter for the user equipment to set the quantity of transmission times N for transmitting the specific preamble to the base station; and a receiver, configured to receive, the specific preamble sent by the user equipment, wherein the specific preamble is transmitted by the user equipment for N times, on the PRACH resource.

12. The base station according to claim 11, wherein the notification further indicates a start location of the PRACH.

13. The base station according to claim 11, wherein the transmission times N is determined based on a receiving power of the user equipment or based on a path loss threshold.

14. The base station according to claim 11, further comprises a processor, configured to perform joint processing on the specific preamble transmitted for N times.

15. The method according to claim 11, wherein the transmitter is further configured to transmit a random access response to the user equipment.

16. A user equipment, comprising:

a transmitter, configured to transmit bundling capability information by a user equipment to a base station, wherein the bundling capability information comprises: information indicating that the user equipment has a maximum capability of transmitting specific data for M times, wherein M is a maximum quantity of transmission times that is supported by the user equipment for the data, and M is greater than or equal to 2;

a receiver, configured to receive a Physical Random Access Channel (PRACH) bundling parameter notification send by a base station, wherein the notification comprises information indicating:

a quantity of transmission times N for which a specific preamble is to be transmitted by the user equipment to the base station, N being less than or equal to M, a PRACH resource for transmitting the specific preamble N times, and a criterion parameter for the user equipment to set the quantity of transmission times N for transmitting the specific data to the base station;

a processor, configured to determine a transmitting time N' of the specific preamble, wherein the transmitting time N' is determined according to at least one of the following: receiving power of the user equipment, a path loss threshold and the PRACH bundling parameter notification;

the transmitter, configured to transmit the specific preamble to the base station of N' times on the PRACH resource.

17. The user equipment according to claim 16, wherein the processor is further configured to determine the PRACH resource.

18. The user equipment according to claim 16, wherein the processor is further configured to determine the specific preamble.

19. The user equipment according to claim 16, wherein the receiver is further configured to receive a random access response sent by the base station.

20. The user equipment according to claim 16, wherein the notification further indicates start location of the Physical Random Access Channel (PRACH).

* * * * *